United States Patent
Blasingame et al.

(10) Patent No.: US 7,210,857 B2
(45) Date of Patent: May 1, 2007

(54) OPTICAL COUPLING SYSTEM

(75) Inventors: Raymond W. Blasingame, Richardson, TX (US); James C. Lee, Plymouth, MN (US); Bernard Q. Li, Plymouth, MN (US)

(73) Assignee: Finisar Corporation, Sunnyvale, CA (US)

( * ) Notice: Subject to any disclaimer, the term of this patent is extended or adjusted under 35 U.S.C. 154(b) by 39 days.

(21) Appl. No.: 10/620,489

(22) Filed: Jul. 16, 2003

(65) Prior Publication Data

US 2005/0013553 A1    Jan. 20, 2005

(51) Int. Cl.
  *G02B 6/36* (2006.01)
  *G02B 6/42* (2006.01)
  *G02B 6/00* (2006.01)
(52) U.S. Cl. .............................. 385/88; 385/53; 385/60
(58) Field of Classification Search ................... 385/78, 385/88–94
  See application file for complete search history.

(56) References Cited

U.S. PATENT DOCUMENTS

| | | | |
|---|---|---|---|
| 4,317,085 A | 2/1982 | Brunham et al. | |
| 4,466,694 A | 8/1984 | MacDonald | |
| 4,660,207 A | 4/1987 | Svilans | |
| 4,675,058 A | 6/1987 | Plaster | |
| 4,784,722 A | 11/1988 | Liau et al. | |
| 4,885,592 A | 12/1989 | Kofol et al. | |
| 4,901,327 A | 2/1990 | Bradley | |
| 4,943,970 A | 7/1990 | Bradley | |
| 4,956,844 A | 9/1990 | Goodhue et al. | |
| 5,031,187 A | 7/1991 | Orenstein et al. | |
| 5,052,016 A | 9/1991 | Mahbobzadeh | |
| 5,056,098 A | 10/1991 | Anthony et al. | |
| 5,062,115 A | 10/1991 | Thornton | |
| 5,068,869 A | 11/1991 | Wang et al. | |
| 5,079,774 A | 1/1992 | Mendez et al. | |
| 5,115,442 A | 5/1992 | Lee et al. | |

(Continued)

FOREIGN PATENT DOCUMENTS

DE    4240706 A1    6/1994

(Continued)

OTHER PUBLICATIONS http://www.sct-ceramics.com/an/materiaux.html, SCT-Ceramics.Com, 1 page, printed Mar. 25, 2003.

(Continued)

*Primary Examiner*—Sung Pak
(74) *Attorney, Agent, or Firm*—Workman Nydegger (57) ABSTRACT

An optical coupling system having a split sleeve with a metallized strip adhered to a housing barrel at one end. The sleeve may be smaller than an optical fiber ferrule. The sleeve may have spring-like flexibility and be stretched open at the slit sufficiently to permit insertion of the ferrule in the sleeve. The sleeve may be made of zirconia. The ferrule may be held by the sleeve's spring-like contraction around the ferrule. Attached at the other end of the barrel may be an optoelectronic element such as a vertical cavity surface emitting laser. An optical fiber end of the ferrule may be aligned with the laser. Since the ferrule may be held firmly by the sleeve attached to the coupling barrel, there would be virtually no movement or wiggle of the fiber end relative to the laser and thus the alignment may be maintained.

21 Claims, 3 Drawing Sheets

U.S. PATENT DOCUMENTS

| | | |
|---|---|---|
| 5,117,469 A | 5/1992 | Cheung et al. |
| 5,121,454 A | 6/1992 | Iwanot et al. |
| 5,140,605 A | 8/1992 | Paoli et al. |
| 5,157,537 A | 10/1992 | Rosenblatt et al. |
| 5,158,908 A | 10/1992 | Blonder et al. |
| 5,212,706 A | 5/1993 | Jain |
| 5,216,263 A | 6/1993 | Paoli |
| 5,216,680 A | 6/1993 | Magnusson et al. |
| 5,231,686 A | 7/1993 | Rabinovich |
| 5,237,581 A | 8/1993 | Asada et al. |
| 5,245,622 A | 9/1993 | Jewell et al. |
| 5,258,990 A | 11/1993 | Olbright et al. |
| 5,262,360 A | 11/1993 | Holonyak, Jr. et al. |
| 5,285,466 A | 2/1994 | Tabatabaie |
| 5,293,392 A | 3/1994 | Shieh et al. |
| 5,317,170 A | 5/1994 | Paoli |
| 5,317,587 A | 5/1994 | Ackley et al. |
| 5,325,386 A | 6/1994 | Jewell et al. |
| 5,331,654 A | 7/1994 | Jewell et al. |
| 5,337,074 A | 8/1994 | Thornton |
| 5,337,183 A | 8/1994 | Rosenblatt et al. |
| 5,349,599 A | 9/1994 | Larkins |
| 5,351,256 A | 9/1994 | Schneider et al. |
| 5,359,447 A | 10/1994 | Hahn et al. |
| 5,359,618 A | 10/1994 | Lebby et al. |
| 5,363,397 A | 11/1994 | Collins et al. |
| 5,373,520 A | 12/1994 | Shoji et al. |
| 5,373,522 A | 12/1994 | Holonyak, Jr. et al. |
| 5,376,580 A | 12/1994 | Kish et al. |
| 5,386,426 A | 1/1995 | Stephens |
| 5,390,209 A | 2/1995 | Vakhshoori |
| 5,396,508 A | 3/1995 | Bour et al. |
| 5,404,373 A | 4/1995 | Cheng |
| 5,404,416 A | 4/1995 | Iwano et al. |
| 5,412,678 A | 5/1995 | Treat et al. |
| 5,412,680 A | 5/1995 | Swirhum et al. |
| 5,416,044 A | 5/1995 | Chino et al. |
| 5,428,634 A | 6/1995 | Bryan et al. |
| 5,438,584 A | 8/1995 | Paoli et al. |
| 5,446,754 A | 8/1995 | Jewell et al. |
| 5,465,263 A | 11/1995 | Bour et al. |
| 5,475,701 A | 12/1995 | Hibbs-Brenner |
| 5,493,577 A | 2/1996 | Choquette et al. |
| 5,497,390 A | 3/1996 | Tanaka et al. |
| 5,513,202 A | 4/1996 | Kobayashi et al. |
| 5,528,711 A | 6/1996 | Iwano et al. |
| 5,530,715 A | 6/1996 | Shieh et al. |
| 5,537,501 A | 7/1996 | Iwano et al. |
| 5,555,255 A | 9/1996 | Kock et al. |
| 5,557,626 A | 9/1996 | Grodinski et al. |
| 5,561,683 A | 10/1996 | Kwon |
| 5,567,980 A | 10/1996 | Holonyak, Jr. et al. |
| 5,568,498 A | 10/1996 | Nilsson |
| 5,568,499 A | 10/1996 | Lear |
| 5,574,738 A | 11/1996 | Morgan |
| 5,581,571 A | 12/1996 | Holonyak, Jr. et al. |
| 5,586,131 A | 12/1996 | Ono et al. |
| 5,590,145 A | 12/1996 | Nitta |
| 5,598,300 A | 1/1997 | Magnusson et al. |
| 5,606,572 A | 2/1997 | Swirhun et al. |
| 5,625,729 A | 4/1997 | Brown |
| 5,642,376 A | 6/1997 | Olbright et al. |
| 5,645,462 A | 7/1997 | Banno et al. |
| 5,646,978 A | 7/1997 | Kem et al. |
| 5,648,978 A | 7/1997 | Sakata |
| 5,661,834 A * | 8/1997 | Watanabe et al. ............... 385/92 |
| 5,673,346 A | 9/1997 | Iwano et al. |
| 5,679,963 A | 10/1997 | Klem et al. |
| 5,692,083 A | 11/1997 | Bennett |
| 5,696,023 A | 12/1997 | Holonyak, Jr. et al. |
| 5,699,373 A | 12/1997 | Uchida et al. |
| 5,712,188 A | 1/1998 | Chu et al. |
| 5,726,805 A | 3/1998 | Kaushik et al. |
| 5,727,013 A | 3/1998 | Botez et al. |
| 5,727,014 A | 3/1998 | Wang et al. |
| 5,751,874 A | 5/1998 | Chudoba et al. |
| 5,774,487 A | 6/1998 | Morgan |
| 5,778,018 A | 7/1998 | Yoshikawa et al. |
| 5,781,575 A | 7/1998 | Nilsson |
| 5,784,399 A | 7/1998 | Sun |
| 5,790,733 A | 8/1998 | Smith et al. |
| 5,796,894 A | 8/1998 | Csipkes et al. |
| 5,805,624 A | 9/1998 | Yang et al. |
| 5,818,066 A | 10/1998 | Duboz |
| 5,828,684 A | 10/1998 | Van de Walle |
| 5,838,705 A | 11/1998 | Shieh et al. |
| 5,838,715 A | 11/1998 | Corzine et al. |
| 5,855,503 A | 1/1999 | Csipkes et al. |
| 5,892,784 A | 4/1999 | Tan et al. |
| 5,892,787 A | 4/1999 | Tan et al. |
| 5,896,408 A | 4/1999 | Corzine et al. |
| 5,901,166 A | 5/1999 | Nitta et al. |
| 5,903,588 A | 5/1999 | Guenter et al. |
| 5,903,589 A | 5/1999 | Jewell |
| 5,903,590 A | 5/1999 | Hadley et al. |
| 5,908,408 A | 6/1999 | McGary et al. |
| 5,936,266 A | 8/1999 | Holonyak, Jr. et al. |
| 5,940,422 A | 8/1999 | Johnson |
| 5,953,362 A | 9/1999 | Pamulapati et al. |
| 5,978,401 A | 11/1999 | Morgan |
| 5,978,408 A | 11/1999 | Thornton |
| 5,995,531 A | 11/1999 | Gaw et al. |
| 6,002,705 A | 12/1999 | Thornton |
| 6,008,675 A | 12/1999 | Handa |
| 6,014,395 A | 1/2000 | Jewell |
| 6,043,104 A | 3/2000 | Uchida et al. |
| 6,046,065 A | 4/2000 | Goldstein et al. |
| 6,052,398 A | 4/2000 | Brillouet et al. |
| 6,055,262 A | 4/2000 | Cox et al. |
| 6,060,743 A | 5/2000 | Sugiyama et al. |
| 6,078,601 A | 6/2000 | Smith |
| 6,086,263 A | 7/2000 | Selli et al. |
| 6,133,590 A | 10/2000 | Ashley et al. |
| 6,144,682 A | 11/2000 | Sun |
| 6,154,480 A | 11/2000 | Magnusson et al. |
| 6,185,241 B1 | 2/2001 | Sun |
| 6,191,890 B1 | 2/2001 | Baets et al. |
| 6,208,681 B1 | 3/2001 | Thorton |
| 6,212,312 B1 | 4/2001 | Grann et al. |
| 6,238,944 B1 | 5/2001 | Floyd |
| 6,269,109 B1 | 7/2001 | Jewell |
| 6,275,643 B1 * | 8/2001 | Bandy et al. ............... 385/140 |
| 6,283,644 B1 * | 9/2001 | Gilliland et al. ............... 385/93 |
| 6,297,068 B1 | 10/2001 | Thornton |
| 6,302,596 B1 | 10/2001 | Cohen et al. |
| 6,309,113 B1 | 10/2001 | Naito |
| 6,339,496 B1 | 1/2002 | Koley et al. |
| 6,369,403 B1 | 4/2002 | Holonyak, Jr. |
| 6,372,533 B2 | 4/2002 | Jayaraman et al. |
| 6,392,257 B1 | 5/2002 | Ramdani et al. |
| 6,410,941 B1 | 6/2002 | Taylor et al. |
| 6,411,638 B1 | 6/2002 | Johnson et al. |
| 6,427,066 B1 | 7/2002 | Grube |
| 6,455,879 B1 | 9/2002 | Ashley et al. |
| 6,459,709 B1 | 10/2002 | Lo et al. |
| 6,459,713 B2 | 10/2002 | Jewell |
| 6,462,360 B1 | 10/2002 | Higgins, Jr. et al. |
| 6,472,694 B1 | 10/2002 | Wilson et al. |
| 6,477,285 B1 | 11/2002 | Shanley |
| 6,487,230 B1 | 11/2002 | Boucart et al. |
| 6,487,231 B1 | 11/2002 | Boucart et al. |
| 6,490,311 B1 | 12/2002 | Boucart et al. |
| 6,493,371 B1 | 12/2002 | Boucart et al. |
| 6,493,372 B1 | 12/2002 | Boucart et al. |

| | | | |
|---|---|---|---|
| 6,493,373 B1 | 12/2002 | Boucart et al. | |
| 6,496,621 B1 | 12/2002 | Kathman et al. | |
| 6,498,358 B1 | 12/2002 | Lach et al. | |
| 6,501,973 B1 | 12/2002 | Foley et al. | |
| 6,515,308 B1 | 2/2003 | Kneissl et al. | |
| 6,535,541 B1 | 3/2003 | Boucart et al. | |
| 6,536,959 B2 | 3/2003 | Kuhn et al. | |
| 6,542,531 B2 | 4/2003 | Sirbu et al. | |
| 6,567,435 B1 | 5/2003 | Scott et al. | |
| 2001/0004414 A1 | 6/2001 | Kuhn et al. | |
| 2002/0150356 A1* | 10/2002 | Hashimoto et al. | 385/92 |
| 2002/0154675 A1 | 10/2002 | Deng et al. | |
| 2002/0172471 A1* | 11/2002 | Slater et al. | 385/78 |
| 2003/0072526 A1 | 4/2003 | Kathman et al. | |
| 2003/0169978 A1* | 9/2003 | Sato et al. | 385/88 |
| 2004/0247255 A1* | 12/2004 | Rosenburg et al. | 385/78 |
| 2005/0036740 A1* | 2/2005 | Itabashi et al. | 385/50 |
| 2005/0036745 A1* | 2/2005 | Nakanishi et al. | 385/88 |

FOREIGN PATENT DOCUMENTS

| | | |
|---|---|---|
| EP | 0288184 A2 | 10/1988 |
| EP | 0776076 A1 | 5/1997 |
| JP | 60123084 | 1/1985 |
| JP | 02054981 | 2/1990 |
| JP | 5299779 | 11/1993 |
| WO | WO 98/57402 | 12/1998 |

OTHER PUBLICATIONS wysiwyg://32/http://www.toto.co.jp/E_Cera/opt_03.htm, TOTO Precision Ceramics & Optical Components, 3 pages, printed May 16, 2003.

http://www.senko.com/fiberoptic/detail_product.php?product=98, Senko Advancedcomponents Zirconia Sleeves and Tubes, 2 pages, printed May 16, 2003.

http://www.adamant.co.jp, Sleeves, 2 pages, Adamant Kogyo Co., Ltd., printed prior to filing date, Jul. 16, 2003.

www.sct-ceramics.com/an/microtubes.html, High Precision Micotubes, 1 sheet, printed prior to filing date, Jul. 16, 2003.

http://www.microtools1.com, Sleeves, Micro Tools, Ltd., 2 pages, printed prior to filing date, Jul. 16, 2003.

Zirconia Ceramic Sleeve, Nano Solution Corp, 1 page, printed prior to filing date, Jul. 16, 2003.

Uncontrolled document C-01-1101-00, printed prior to filing date, Jul. 16, 2003.

Banwell et al., "VCSE Laser Transmitters for Parallel Data Links", *IEEE Journal of Quantum Electronics*, vol. 29, No. 2, Feb. 1993, pp. 635-644.

Bowers et al., "Fused Vertical Cavity Lasers With Oxide Aperture", Final report for MICRO project 96-042, Industrial Sponsor: Hewlett Packard, 4 pages, 1996.

Catchmark et al., "High Temperature CW Operation of Vertical Cavity Top Surface-Emitting Lasers", CLEO 1993, p. 138.

Chemla et al., "Nonlinear Optical Properties of Semiconductor Quantum Wells", *Optical Nonlinearities and Instabilities in Semiconductors*, Academic Press, Inc., Copyright 1988, pp. 83-120.

Choe, et al., "Lateral oxidation of AlAs layers at elevated water vapour pressure using a closed-chamber system," Letter to the Editor, Semiconductor Science Technology, 15, pp. L35-L38, Aug. 2000.

Choa et al., "High-Speed Modulation of Vertical-Cavity Surface-Emitting Lasers", *IEEE Photonics Technology Letter*, vol. 3, No. 8, Aug. 1991, pp. 697-699.

Choquette et al., "High Single Mode Operation from Hybrid Ion Implanted/Selectively Oxidized VCSELs", 200 IEEE 17th International Semiconductor Laser Conference, Monterrey, CA pp. 59-60, 2000.

Choquette et al., "Lithographically-Defined Gain Apertures Within Selectively Oxidized VCSELs", paper CtuL6, Conference on Lasers and Electro-Optics, San Francisco, California (2000).

Choquette, et al., "VCSELs in information systems: 10Gbps$^{-1}$ oxide VCSELs for data communication", Optics In Information Systems, vol. 12, No. 1, p. 5, SPIE International Technical Group Newsletter, Apr. 2001.

Chua, et al., "Low-Threshold 1.57-μm VC-SEL's Using Strain-Compensated Quantum Wells and Oxide/Metal Backmirror," IEEE Photonics Technology Letters, vol. 7, No. 5, pp. 444-446, May 1995.

Chua et al., "Planar Laterally Oxidized Vertical-Cavity Lasers for Low-Threshold High-Density Top-Surface-Emitting Arrays," IEEE Photonics Technology Letters, vol. 9, No. 8, pp. 1060-1062, Aug. 1997.

Cox, J. A., et al., "Guided Mode Grating Resonant Filters for VCSEL Applications", *Proceedings of the SPIE*, The International Society for Optical Engineering, Diffractive and Holographic Device Technologies and Applications V, San Jose, California, Jan. 28-29, 1998, vol. 3291, pp. 70-71.

Farrier, Robert G., "Parametric control for wafer fabrication: New CIM techniques for data analysis," Solid State Technology, pp. 99-105, Sep. 1997.

Fushimi, et al., "Degradation Mechanism in Carbon-doped GaAs Minority-carrier Injection Devices," 34$^{th}$ Annual IRPS Proceedings, Dallas, TX., Apr. 29-May 2, 1996, 8 pages.

G. G. Ortiz, et al., "Monolithic Integration of In0.2 GA0.8As Vertical Cavity Surface-Emitting Lasers with Resonance-Enhanced Quantum Well Photodetectors", *Electronics Letters*, vol. 32, No. 13, Jun. 20, 1996, pp. 1205-1207.

G. Shtengel et al., "High-Speed Vertical-Cavity Surface-Emitting Lasers", *Photon. Tech. Lett.*, vol. 5, No. 12, pp. 1359-1361 (Dec. 1993).

Geib, et al., "Comparison of Fabrication Approaches for Selectively Oxidized VCSEL Arrays," Proceedings of SPIE, vol. 3946, pp. 36-40, 2000.

Graf, Rudolph, *Modern Dictionary of Electronics*, 6$^{th}$ ed., Indiana: Howard W. Sams & Company, 1984, p. 694.

Guenter et al., "Reliability of Proton-Implanted VCSELs for Data Communications", Invited paper, SPIE, vol. 2683, OE LASE 96; Photonics West: Fabrication, Testing and Reliability of Semiconductor Lasers, (SPIE, Bellingham, WA 1996).

Guenter, et al., "Commercialization of Honeywell's VCSEL technology: further developments," Proceedings of the SPIE, vol. 4286, GSPIE 2000, 14 pages.

Hadley et al., "High-Power Single Mode Operation from Hybrid Ion Implanted/Selectively Oxidized VCSELs", 13th Annual Meeting IEEE Lasers and Electro-Optics Society 2000 Annual Meeting (LEOS 2000), Rio Grande, Puerto Rico, pp. 804-805.

Hawthorne, et al., "Reliability Study of 850nm VCSELs for Data Communications," IEEE, pp. 1-11, May 1996.

Herrick, et al., "Highly reliable oxide VCSELs manufactured at HP/Agilent Technologies," Invited Paper, Proceedings of SPIE vol. 3946, pp. 14-19, 2000.

Hibbs-Brenner et al., "Performance, Uniformity and Yield of 850nm VCSELs Deposited by MOVPE", *IEEE Phot. Tech. Lett.*, vol. 8, No. 1, pp. 7-9, Jan. 1996.

Hideaki Saito, et al., "Controlling polarization of quantum-dot surface-emitting lasers by using structurally anisotropic self-assembled quantum dots," American Institute of Physics, Appl, Phys. Lett. 71 (5), pp. 590-592, Aug. 4, 1997.

Hornak et al., "Low-Temperature (10K-300K) Characterization of MOVPE-Grown Vertical-Cavity Surface-Emitting Lasers", *Photon. Tech. Lett.*, vol. 7, No. 10, pp. 1110-1112, Oct. 1995.

Huffaker et al., "Lasing Characteristics of Low Threshold Microcavity Layers Using Half-Wave Spacer Layers and Lateral Index Confinement", *Appl. Phys. Lett.*, vol. 66, No. 14, pp. 1723-1725, Apr. 3, 1995.

Jewell et al., "Surface Emitting Microlasers for Photonic Switching & Intership Connections", *Optical Engineering*, vol. 29, No. 3, pp. 210-214, Mar. 1990.

Jiang et al., "High-Frequency Polarization Self-Modulation in Vertical-Cavity Surface-Emitting Lasers", *Appl. Phys. Letters*, vol. 63, No. 26, Dec. 27, 1993, pp. 2545-2547.

K.L. Lear et al., "Selectively Oxidized Vertical Cavity Surface-Emitting Lasers with 50% Power Conversion Efficiency", *Elec. Lett.*, vol. 31, No. 3 pp. 208-209, Feb. 2, 1995.

Kash, et al., " Recombination in GaAs at the AlAs oxide-GaAs interface," Applied Physics Letters, vol. 67, No. 14, pp. 2022-2024, Oct. 2, 1995.

Kishino et al., "Resonant Cavity-Enhanced (RCE) Photodetectors", *IEEE Journal of Quantum Electronics*, vol. 27, No. 8, pp. 2025-2034, Aug. 1991.

Koley B., et al., "Dependence of lateral oxidation rate on thickness of AlAs layer of interest as a current aperture in vertical-cavity surface-emitting laser structures", Journal of Applied Physics, vol. 84, No. 1, pp. 600-605, Jul. 1, 1998.

Kuchibhotla et al., "Low-Voltage High Gain Resonant_Cavity Avalanche Photodiode", *IEEE Phototonics Technology Letters*, vol. 3, No. 4, pp. 354-356, Apr. 1991.

Lai et al., "Design of a Tunable GaAs/AlGaAs Multiple-Quantum-Well Resonant Cavity Photodetector", *IEEE Journal of Quantum Electronics*, vol. 30, No. 1, pp. 108-114, 1994.

Lee et al., "Top-Surface Emitting GaAs Four-Quantum-Well Lasers Emitting at 0-85 um", *Electronics Letters*, vol. 24, No. 11, May 24, 1990, pp. 710-711.

Lehman et al., "High Frequency Modulation Characteristics of Hybrid Dielectric/AlGaAs Mirror Singlemode VCSELs", *Electronic Letters*, vol. 31, No. 15, Jul. 20, 1995, pp. 1251-1252.

Maeda, et al., "Enhanced Glide of Dislocations in GaAs Single Crystals by Electron Beam Irradiation," Japanese Journal of Applied Physics, vol. 20, No. 3, pp. L165-L168, Mar. 1981.

Magnusson, "Integration of Guided-Mode Resonance Filters and VCSELs", Electo-Optics Research Center, Department of Electrical Engineering, University of Texas at Arlington, May 6, 1997.

Martinsson et al., "Transverse Mode Selection in Large-Area Oxide-Confined Vertical-Cavity Surface-Emitting Lasers Using a Shallow Surface Relief", *IEEE Photon. Technol. Lett.*, 11(12), 1536-1538 (1999).

Miller et al., "Optical Bistability Due to Increasing Absorption", *Optics Letters*, vol. 9, No. 5, May 1984, pp. 162-164.

Min Soo Park and Byung Tae Ahn, "Polarization control of vertical-cavity surface-emitting lasers by electro-optic birefringence," Applied Physics Letter, vol. 76, No. 7, pp. 813-815, Feb. 14, 2000.

Morgan et al., "200 C, 96-nm Wavelength Range, Continuous-Wave Lasing from Unbonded GaAs MOVPE-Grown Vertical Cavity Surface-Emitting Lasers", *IEEE Photonics Technology Letters*, vol. 7, No. 5, May 1995, pp. 441-443.

Morgan et al., "High-Power Coherently Coupled 8×8 Vertical Cavity Surface Emitting Laser Array", *Appl. Phys Letters*, vol. 61, No. 10, Sep. 7, 1992, pp. 1160-1162.

Morgan et al., "Hybrid Dielectric/AlGaAs Mirror Spatially Filtered Vertical Cavity Top-Surface Emitting Laser", *Appl. Phys. Letters*, vol. 66, No. 10, Mar. 6, 1995, pp. 1157-1159.

Morgan et al., "Novel Hybrid-DBR Single-Mode Controlled GaAs Top-Emitting VCSEL with Record Low Voltage", 2 pages, dated prior to Dec. 29, 2000.

Morgan et al., "One Watt Vertical Cavity Surface Emitting Laser", *Electon. Lett.*, vol. 29, No. 2, pp. 206-207, Jan. 21, 1993.

Morgan et al., "Producible GaAs-based MOVPE-Grown Vertical-Cavity Top-Surface Emitting Lasers with Record Performance", *Elec. Lett.*, vol. 31, No. 6, pp. 462-464, Mar. 16, 1995.

Morgan et al., "Progress and Properties of High-Power Coherent Vertical Cavity Surface Emitting Laser Arrays", SPIE, Vo. 1850, Jan. 1993, pp. 100-108.

Morgan et al., "Progress in Planarized Vertical Cavity Surface Emitting Laser Devices and Arrays", *SPIE*, vol. 1562, Jul. 1991, pp. 149-159.

Morgan et al., "Spatial-Filtered Vertical-Cavity Top Surface-Emitting Lasers", CLEO, 1993, pp. 138-139.

Morgan et al., "Submilliamp, Low-Resistance, Continuous-Wave, Single-Mode GaAs Planar Vertical-Cavity Surface Emitting Lasers", Honeywell Technology Center, Jun. 6, 1995.

Morgan et al., "Transverse Mode Control of Vertical-Cavity Top-Surface Emitting Lasers", *IEEE Photonics Technology Letters*, vol. 4, No. 4, Apr. 1993, pp. 374-377.

Morgan et al., "Vertical-cavity surface-emitting laser arrays", Invited Paper, SPIE, vol. 2398, Feb. 6, 1995, pp. 65-93.

Morgan et al., Vertical-cavity surface emitting lasers come of age, Invited paper, SPIE, vol. 2683, 0-8194-2057, Mar. 1996, pp. 18-29.

Morgan, "High-Performance, Producible Vertical Cavity Lasers for Optical Interconnects", *High Speed Electronics and Systems*, vol. 5, No. 4, Dec. 1994, pp. 65-95.

Naone R.L., et al., "Tapered-apertures for high-efficiency miniature VCSELs", LEOS newsletter, vol. 13, No. 4, pp. 1-5, Aug. 1999.

Nugent et al., "Self-Pulsations in Vertical-Cavity Surface-Emitting Lasers", *Electronic Letters*, vol. 31, No. 1, Jan. 5, 1995, pp. 43-44.

Oh, T. H. et al., "Single-Mode Operation in Antiguided Vertical-Cavity Surface-Emitting Laser Using a Low-Temperature Grown AlGaAs Dielectric Aperture", *IEEE Photon. Technol. Lett.* 10(8), 1064-1066 (1998).

Osinski, et al., "Temperature and Thickness Dependence of Steam Oxidation of AlAs in Cylindrical Mesa Structure," IEEE Photonics Technology Letters, vol. 13, No. 7, pp. 687-689, Jul. 2001.

Peck, D. Stewart, Comprehensive Model for Humidity Testing Correlation, IEEE/IRPS, pp. 44-50, 1986.

Ries, et al., "Visible-spectrum ($\lambda$=650nm) photopumped (pulsed, 300 K) laser operation of vertical-cavity AlAs-AlGaAs/InAlP-InGaP quantum well heterostructure utilizing native oxide mirrors," Applied Physics Letters, vol. 67, No. 8, pp. 1107-1109, Aug. 21, 1995.

S.S. Wang and R. Magnusson, "Multilayer Waveguide-Grating Filters", *Appl. Opt.*, vol. 34, No. 14, pp. 2414-2420, 1995.

S.S. Wang and R. Magnusson, "Theory and Applications of Guided-Mode Resonance Filters", *Appl. Opt.*, vol. 32, No. 14, pp. 2606-2613, 1993.

Sah, et al., "Carrier Generation and Recombination in *P-N* Junctions and *P-N* Junction Characteristics," Proceedings of the IRE, pp. 1228-1243, Sep. 1957.

Schubert, "Resonant Cavity Light-Emitting Diode", *Appl. Phys. Lett.*, vol. 60, No. 8, pp. 921-923, Feb. 24, 1992.

Shi, et al., "Photoluminescence study of hyrogenated aluminum oxide-semiconductor interface," Applied Physics Letters, vol. 70, No. 10, pp. 1293-1295, Mar. 10, 1997.

Smith, R.E. et al., Polarization-Sensitive Subwavelength Antireflection Surfaces on a Semiconductor for 975 NM, *Optics Letters*, vol. 21, No. 15, Aug. 1, 1996, pp. 1201-1203.

Spicer, et al., "The Unified Model For Schottky Barrier Formation and MOS Interface States in 3-5 Compounds," Applications of Surface Science, vol. 9, pp. 83-01, 1981.

Suning Tang et al., "Design Limitations of Highly Parallel Free-Space Optical Interconnects Based on Arrays of Vertical Cavity Surface-Emitting Laser Diodes, Microlenses, and Photodetectors", Journal of Lightwave Technology, vol. 12, No. 11, Nov. 1, 1994, pp. 1971-1975.

T. Mukaihara, "Polarization Control of Vertical-cavity Surface-Emitting Lasers by a Birefringent Metal/Semiconductor Polarizer Terminating a Distributed Bragg Reflector," Tokyo Institute of Technology, Precision and Intelligence Laboratory, pp. 183-184, 1995.

Tao, Andrea, "Wet-Oxidation of Digitally Alloyed AlGaAs," National Nanofabrication Users Network, Research Experience for Undergraduates 2000, 2 pages.

Tautum, et al., Commerialization of Honeywell's VCSEL Technology, Published in Proceedings fo the SPIE, vol. 3946, SPI, 2000, 12 pages.

Tshikazu Mukaihara, et al., "A Novel Birefringent Distributed Bragg Reflector Using a Metal/Dielectric Polarizer for Polarization Control of Surface-Emitting Lasers," Japan J. Appl. Phys. vol. 33 (1994) pp. L227-L229, Part 2, No. 2B, Feb. 15, 1994.

Tu, Li-Wei et al., "Transparent conductive metal-oxide contacts in vertical-injection top-emitting quantum well lasers", Appl. Phys. Lett. 58 (8) Feb. 25, 1991, pp. 790-792.

Wieder, H.H., "Fermi level and surface barrier of $Ga_xIn_{1-x}As$ alloys," Applied Physics Letters, vol. 38, No. 3, pp. 170-171, Feb. 1, 1981.

Wipiejewski, et al., "VCSELs for datacom applications," Invited Paper, Part of the SPIE Conference on Vertical-Cavity Surface-Emitting Lasers III, San Jose, California, SPIE vol. 3627, pp. 14-22, Jan. 1999.

Y.M. Yang et al., "Ultralow Threshold Current Vertical Cavity Surface Emitting Lasers Obtained with Selective Oxidation", *Elect. Lett.*, vol. 31, No. 11, pp. 886-888, May 25, 1995.

Yablonovitch et al., "Photonic Bandgap Structures", *J. Opt. Soc. Am. B.*, vol. 10, No. 2, pp. 283-295, Feb. 1993.

Young et al., "Enhanced Performance of Offset-Gain High Barrier Vertical-Cavity Surface-Emitting Lasers", *IEEE J. Quantum Electron.*, vol. 29, No. 6, pp. 2013-2022, Jun. 1993.

U.S. Appl. No. 09/751,422, filed Dec. 29, 2000, entitled "Resonant Reflector for Use with Optoelectronic Devices".

U.S. Appl. No. 09/751,423, filed Dec. 29, 2000, entitled "Spatially Modulated Reflector for an Optoelectronic Device".

* cited by examiner

OPTICAL COUPLING SYSTEM

BACKGROUND

The invention relates to optical devices and more particularly to devices for providing coupling between optoelectronic elements and optical fiber.

Several patent documents may be related to optical coupling between optoelectronic elements and optical media. They include U.S. Pat. No. 6,086,263 by Selli et al., issued Jul. 11, 2000, entitled "Active Device Receptacle" and owned by the assignee of the present application; U.S. Pat. No. 6,302,596 B1 by Cohen et al., issued Oct. 16, 2001, and entitled "Small Form Factor Optoelectronic Receivers"; U.S. Pat. No. 5,692,083 by Bennet, issued Nov. 25, 1997, and entitled "In-Line Unitary Optical Device Mount and Package therefore"; and U.S. Pat. No. 6,536,959 B2, by Kuhn et al., issued Mar. 25, 2003, and entitled "Coupling Configuration for Connecting an Optical Fiber to an Optoelectronic Component"; which are herein incorporated by reference.

In the context of the invention, the optoelectronic element may be understood as being a transmitter or a receiver. When electrically driven, the optoelectronic element in the form of a transmitter converts the electrical signals into optical signals that are transmitted in the form of light signals. On receiving optical signals, the optoelectronic element in the form of a receiver converts these signals into corresponding electrical signals that can be tapped off at the output. In addition, an optical fiber is understood to be any apparatus for forwarding an optical signal with spatial limitation, in particular preformed optical fibers and so-called waveguides.

Fiber optic receptacle designs of the related art having sleeves use a fiber optic stub or other precision diameter devices or inserts to mechanically hold a sleeve in position. This method of mechanically mounting the sleeve prevents certain types of optical designs from being implemented.

In the related art, the standard single mode optical receptacle design may use various implementations of structure in conjunction with a fiber stub/pig-tail. However, since the stub/pig-tail is expensive and fragile and/or difficult to handle, a stub-less approach would be desirable.

SUMMARY

The present invention may fulfill the desire for a stubless receptacle design. An instance of the invention optical coupling system may include a support structure, a holding structure attached to said support structure and an optical medium holder held by the holding structure. The holding structure may have a sheet or layer of material shaped so as to semi-enclose the optical medium holder. The sheet or layer of material may apply a pressure of contact at least partially around on the optical medium holder. There may be an optoelectronic element holder attached to the support structure. The optical medium holder and optoelectronic element holder may need a certain alignment relative to each other. The holding structure may maintain the certain alignment of the optical medium holder with the optoelectronic element holder with virtually no wiggle. The sheet of material may be a sleeve having a slit. The optical medium holder may have an outside diameter slightly larger than an inside diameter of the sleeve with the optical medium holder not in the sleeve. The inside diameter of the sleeve may be expanded against a spring-like tension to a size of the outside diameter of the optical medium holder with the optical medium holder in the sleeve. The optical medium holder may hold an optical fiber and the optoelectronic element holder may hold a light source. The light source may be a laser, and more specifically may be a vertical cavity surface emitting laser. The optical fiber may be a single mode fiber. The holding structure may maintain a certain alignment between an end of the single mode fiber and the vertical cavity surface emitting laser. In other words, the sleeve expands with flex-like resistance upon an insertion of the optical fiber ferrule and holds the ferrule in position relative to the barrel in a consistent and essentially centered position within the sleeve so as to maintain the established optical alignment of the mated elements. Instead of a light source, the optoelectronic element holder may hold a detector.

An instance of the present system may involve a split sleeve available from certain vendors. Such item may be inexpensive (less than one U.S. dollar in year 2003). In the split sleeve approach, a strip of metallization may be applied to the outside surface along a length of a zirconia split sleeve opposite of the slit. The metallization may be fired on the sleeve using one of several available metallization techniques. The sleeve may be secured at the area of metallization in position relative to metal receptacle housings or coupler barrels with standard metal-to-metal joining techniques such as solder or brazing or alternatively, a non-migrating adhesive. Many other techniques and materials may be used for assuring secure attachment of the sleeve to the housing or barrel. An advantage of the metallization technique may be that the metallization patch defines the surface area of the sleeve to be bonded so that only the desired area is attached. Moreover, since this patch area may be reasonably accurately defined and controlled by standard masking/patterning techniques, this may result in consistent mechanical joint characteristics. In contrast, a downside with using an adhesive is that some adhesives might migrate resulting in variable joint contact area or even a slight shift of the sleeve relative to the housing or the barrel to which it would be attached. This shift may degrade the alignment of the fiber of the ferrule with the laser source, photo detector, or other optoelectronic element. A true non-movement of the sleeve after attachment at the bonding path to the receptacle or barrel is important so that the zirconia split sleeve does not affect overall alignment. The split sleeve may need to flex in order to hold a fiber optic ferrule firmly in the appropriate position. With this approach, precise alignment of the ferrule held by the zirconia split sleeve in the fiber optic receptacle may be achievable. This manner for attaining a fixed location of the fiber or medium in the receptacle or barrel may prevent wiggle of the ferrule and maintain precise alignment of the ferrule with the optoelectronic element in the optical assembly.

DESCRIPTION

Figures 1, 1A:
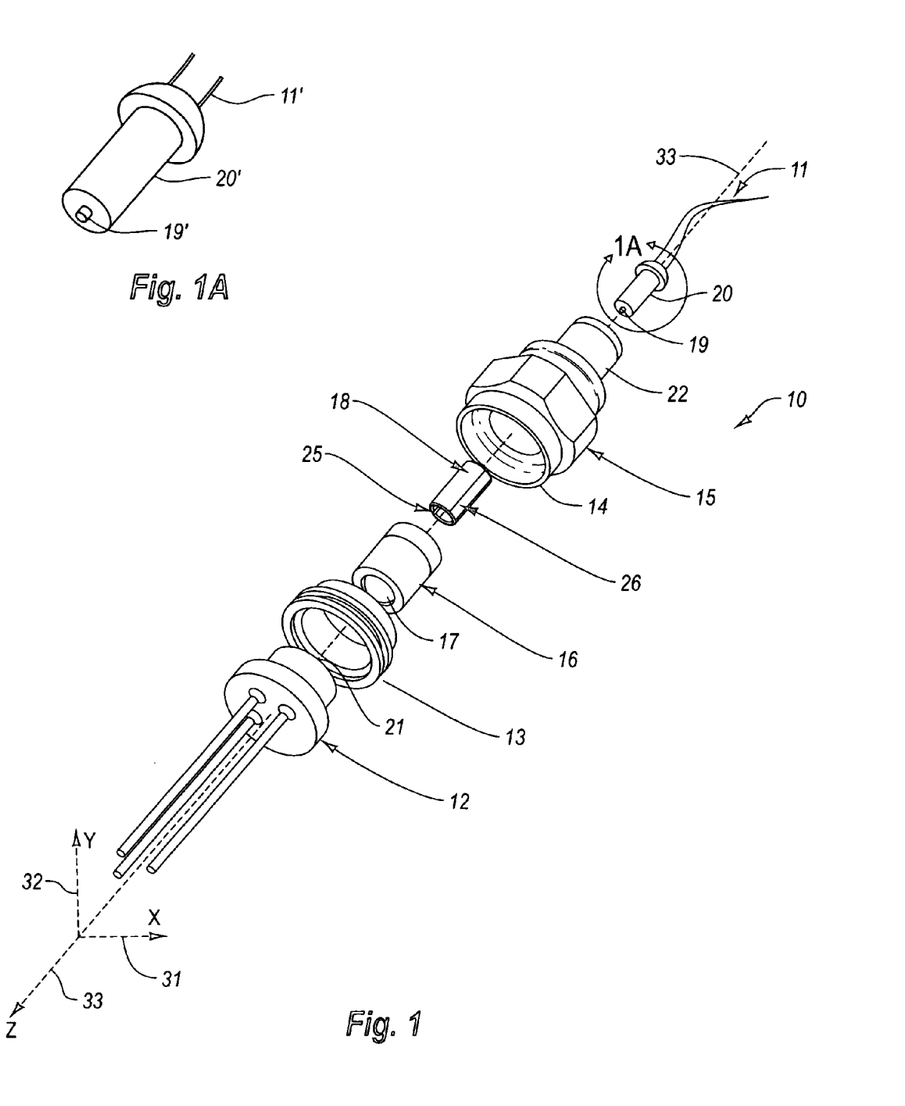
FIG. 1 is an exploded perspective view of an optical coupler incorporating the split sleeve used to hold a ferrule firmly in place in the coupler.
FIG. 1a is a detail view disclosing further information concerning aspects of the device disclosed in FIG. 1.

FIG. 1 shows an optical assembly 10 which may be utilized for coupling an optical fiber 11 with an optoelectronic element 21 of package or housing 12. Housing or package 12 holding element 21 may fit into or onto a z-axis alignment sleeve 13. Alignment sleeve 13 may be secured to housing 12 with a weld or an adhesive. Or housing 12 and alignment sleeve 13 may be machined so that they may have threads about their inside and outside circumferences, respectively, and be screwed together. An alternative approach would be for sleeve 13 to be press fit to housing 12. Sleeve 13 may be slipped onto or in the end 14 of a metal barrel 15. Within sleeve 13 and barrel 15 may be an optical subassembly 16. Subassembly 16 may include a ball lens optical arrangement for focusing the sensing or emitting element 21 with an end 19 of optical fiber 11 at the center of the base of a ferrule 20. Alternatively, end 19 of optical fiber 11 may be configured like end 19' of optical fiber 11' extending out from ferrule 20', as shown in FIG. 1A. Returning to FIG. 1, the optics of assembly 16 may include some other arrangement such as one incorporating an aspheric lens. A zirconia split sleeve 18 may be inserted into a portion 22 of barrel 15. Ferrule 20 may be inserted into split sleeve 18. Alignment sleeve 13 may be slipped into or onto portion 14 of barrel 15. The z-alignment of element 12 may be adjusted in terms of its distance from core end 19 of fiber 11 along the longitudinal or z axis 33 of assembly 10. Upon appropriate adjustment of sleeve 13 relative to portion 14 of barrel IS, sleeve 13 may be fixed to portion 14 with a weld or some other securing mechanism. It may instead involve a set of machined threads on sleeve 13 that fit a set of threads in portion 14. Then sleeve 13 may be screwed into portion 14 for the adjustment and securing of sleeve 13, housing 12 and optical assembly relative to barrel 15.

Split sleeve 18 is a significant part of assembly 10 as it may provide for maintaining an x and a y alignment of fiber end 19 with device 21 of element 12. It may be the structure of split sleeve 18, the manner of mounting the split sleeve 18 and the way it holds ferrule 20 which may provide a virtually wiggle-free securing of ferrule 20 for maintaining the alignment of fiber core end 19 with optoelectronic element 21 of housing or package 12. Split sleeve 18 may bias ferrule 20 to one side of the sleeve with a spring-like force on ferrule 20 to that side. Thus, if the ferrules 20 used in sleeve 18 vary somewhat in size or diameter, they may all be hold-able by sleeve 18 in a firm position or location relative to sleeve 18. This tension of holding ferrule 20 in place may prevent wiggle of ferrule 20 in the optical coupler assembly 10 so long as sleeve 18 is firmly attached to portion 22 of barrel 15. The latter may be made of a metal. The inside diameter of split sleeve 18 may be slightly smaller than the outside diameter of ferrule 20. Thus, the stretching of sleeve 18 needed to allow the insertion of ferrule 20 in sleeve 18 may result in a spring tension on ferrule 20 by split sleeve 18. During the insertion of ferrule 20 into sleeve 18, slit 25 of sleeve 18 may become wider to accommodate a slightly larger ferrule inside of sleeve 18. Split sleeve 18 may be made from a zirconia ceramic material. This material may be exceptionally hard. It also may be dimensionally stable over temperature changes. The zirconia ceramic may be springy and may be precisely machined. Ferrule 20 may be made of the same material as that of sleeve 18. Thus the coefficients of thermal expansion of sleeve 18 and ferrule 20 may be approximately the same.

Figure 2:
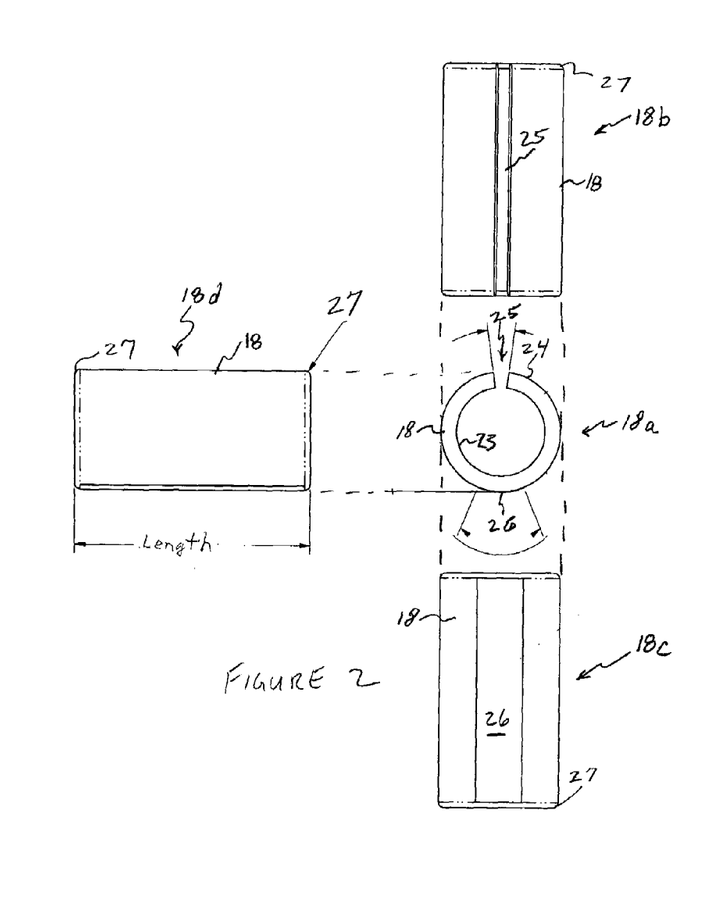
FIG. 2 is a group of aligned plan views of the split sleeve used in the coupler of FIG. 1.

FIG. 2 shows four views 18a, 18b, 18c and 18d of an illustrative example of zirconia split sleeve 18. View 18a is an end view of sleeve 18 that reveals the radii of an inside surface 23 and outside surface 24. There may be a slit or space 25 in sleeve 18 which amounts to about 15 degrees of the circumference of sleeve 18 and extends about the length of sleeve 18 as shown in view 18b. An example sleeve IS may be ordered from Toto Ltd. in Japan at www.toto.co.ip. There may be two versions of the sleeve, that is a mini split sleeve and a standard split sleeve. The mini split sleeve may have an inside diameter from about 1.240 to about 1.245 mm and an outside diameter of about 1.6 to about 1.7 mm. This sleeve may have a length between about 5 and 7 mm. The slit width may be about 0.2 mm. The pull-out, withdrawal or extraction force may be between about 1 and 3 N for standard specification zirconia ferruled fibers. The standard split sleeve may have an inside diameter from about 2.490 to about 2.495 mm and an outside diameter of about 3.2 to about 3.4 mm. The sleeve may have a length between about 5 and 13 mm. The slit width may be about 0.5 mm. The pull-out, withdrawal or extraction force may be between about 2 and 6 N. On the surface of sleeve 18 directly opposite from slit 25 may be a metallization layer 26 on outer surface 24. Layer 26 may cover about 45 degrees of the circumference of surface 24 and be about the length of sleeve 18 as shown in view 18c. The thickness of metallization layer may be about 0.005 mm (0.0002 in.). View 18d shows sleeve 18 from the side with the metallization surface facing downward. The edges 27 of sleeve 18 may have a rounded outer edge and a beveled inside edge. The outside diameter of a mini ferrule may be about 1.25 mm and the standard ferrule may be about 2.5 mm. The diameter of the hole for fiber core 19 is about the size of the outside diameter of the fiber.

Figure 3A:
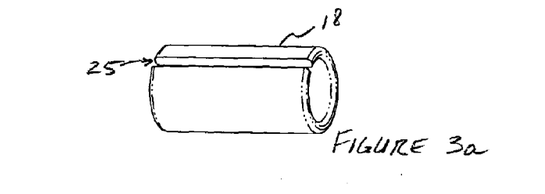
FIGS. 3a and 3b are perspective views illustrating the split sleeve of FIG. 2.
Figure 3B:
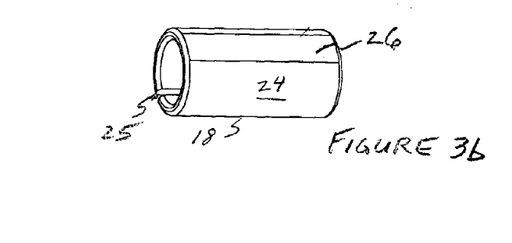

FIG. 3a is a perspective view of sleeve 18 showing slit 25. FIG. 3b is another perspective view of sleeve 18 showing metallization strip 26 on outer surface 24 opposite of slit 25.

Figure 4:
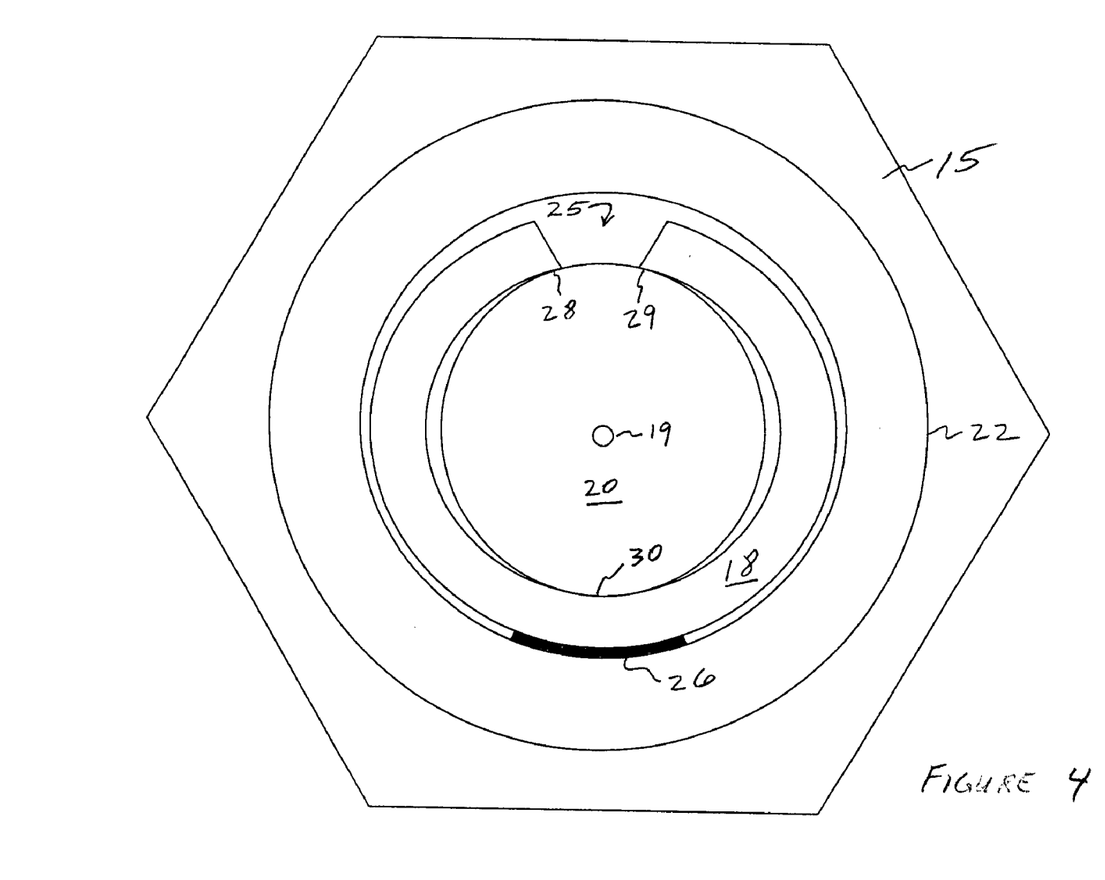
FIG. 4 is a cross-section view of the optical coupler at about the end of the ferrule.

FIG. 4 is a cross-section view at about the fiber core end 19 and looking at the end surface of ferrule 20. This figure is not drawn to scale. Sleeve 18 may be secured and brazed to barrel 15 in portion 22 at metallization 26 area. As ferrule 20 is inserted into sleeve 18, it may flex, spring or stretch out sleeve 18 and slightly widen slit 25. Since sleeve 18 may tend to return to its original shape, tension may be maintained on ferrule 20 by sleeve 18 at points or surfaces 28 and 29 at about the inner edges of slit 25, and at point or surface 30 opposite of slit 25. The three places 28, 29 and 30 of contacts under pressure between sleeve 18 and ferrule 20 may firmly hold ferrule 20 in one position relative to sleeve 18 and barrel 15. Thus, there would appear to be no wiggle or movement, particularly in the x direction or axis 31 and the y direction or axis 32 (perpendicular to the longitudinal axis or z alignment direction 33) of ferrule 20 and fiber core 19 relative to sleeve 18, barrel 15 and optoelectronic element 21 in package 12. This may result in a precise location of fiber core 19 on the tip of ferrule 20 after plug-in, which may be aligned actively to element 21 and/or coupling optics appropriate to a design application. The achieved precise alignment may be retained. This coupling arrangement may be done in one and two dimensional arrays.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. An optical coupler system comprising:
   a housing;
   a sleeve situated in and attached to said housing, the sleeve having a changeable inside diameter; and
   a ferrule removably positioned within said sleeve, a relation between the sleeve and the ferrule being such that when the ferrule is positioned within the sleeve, the sleeve has a first inside diameter, and after the ferrule is removed from the sleeve, the sleeve has a second inside diameter that is less than the first inside diameter, wherein the sleeve has a rounded outside edge and a beveled inside edge, and wherein the sleeve is attached to the housing by a single strip of metallization covering an arc of about 45° or less of the circumference of the sleeve and running substantially the length of the sleeve.

2. The system of claim 1, wherein said sleeve has a lengthwise slit.

3. The system of claim 1, wherein:
   said ferrule has an outside diameter larger than said inside diameter of said sleeve when said ferrule is not situated in said sleeve; and
   the inside diameter of said sleeve is substantially the same as the outside diameter of said ferrule when said ferrule is situated in said sleeve.

4. The system of claim 3, wherein said ferrule holds an optical fiber.

5. The system of claim 4, wherein an end of said optical fiber in said ferrule is aligned with an optoelectronic element situated in said housing.

6. An optical coupling system comprising:
   a support structure; and
   a holding structure attached to said support structure, where said holding structure has a changeable inside diameter and is configured to removably receive an optical medium holder having an outside diameter, the inside diameter being substantially the same as the outside diameter when the optical medium holder is received in the holding structure, and the inside diameter being less than the outside diameter after the optical medium holder is removed from the holding structure, wherein the edge of the inside diameter is a beveled edge, and wherein the holding structure is attached to the support structure by a single strip of metallization covering an arc of about 45° or less of the circumference of the holding structure and running substantially the length of the holding structure.

7. The system of claim 6, wherein said holding structure comprises a sheet of material configured to at least partially enclose a received optical medium holder.

8. The system of claim 7, wherein said sheet of material is configured to apply pressure at a plurality of points of contact between said sheet of material and a received optical medium holder.

9. The system of claim 8, further comprising an optoelectronic element holder attached to said support structure.

10. The system of claim 7, wherein said sheet of material is a sleeve having a slit.

11. The system of claim 9, further comprising an optical transmitter held by said optoelectronic element holder.

12. The system of claim 10, wherein said sleeve has a rounded outside edge and the beveled edge is an inside edge of the sleeve.

13. An optical coupler system comprising:
    a housing;
    a ferrule; and
    means for holding the ferrule, where the means for holding the ferrule removably retains the ferrule in position relative to a portion of the housing by way of spring tension, wherein the means for holding a ferrule has a rounded outside edge and a beveled inside edge, and wherein the means for holding the ferrule is attached to the housing by a single strip of metallization covering an arc of about 45° or less of the circumference of the means for holding the ferrule and running substantially the length of the means for holding the ferrule.

14. The optical coupler system as recited in claim 13, further comprising:
    an optical fiber held by the ferrule; and
    an optoelectronic device positioned in the housing and configured for communication with the optical fiber.

15. The optical coupler system as recited in claim 13, wherein the optical fiber is a single mode fiber.

16. The optical coupler system as recited in claim 13, wherein the optoelectronic device is one of: an optical transmitter; or, an optical receiver.

17. The optical coupler system as recited in claim 13, wherein the means for holding the ferrule exerts substantially no spring tension when not holding the ferrule.

18. The optical coupler system as recited in claim 13, wherein the means for holding the ferrule exerts a pressure of contact around at least a portion of the ferrule.

19. The optical coupler system as recited in claim 14, wherein the means for holding the ferrule maintains a desired alignment of the optical fiber with the optoelectronic device.

20. The optical coupler system as recited in claim 13, wherein the means for holding the ferrule substantially prevents movement of the ferrule in the "x" and "y" directions.

21. The optical coupler system as recited in claim 13, wherein the means for holding the ferrule comprises a sleeve attached to the housing and defining a longitudinal slit.

* * * * *

UNITED STATES PATENT AND TRADEMARK OFFICE
CERTIFICATE OF CORRECTION

| | | |
|---|---|---|
| PATENT NO. | : 7,210,857 B2 | Page 1 of 1 |
| APPLICATION NO. | : 10/620489 | |
| DATED | : May 1, 2007 | |
| INVENTOR(S) | : Blasingame et al. | |

It is certified that error appears in the above-identified patent and that said Letters Patent is hereby corrected as shown below:

Column 3
Line 30, change "IS" to --15--

Column 4
Line 5, change "IS" to --18--

Signed and Sealed this

Twenty-third Day of March, 2010

David J. Kappos
*Director of the United States Patent and Trademark Office*